UNITED STATES PATENT OFFICE.

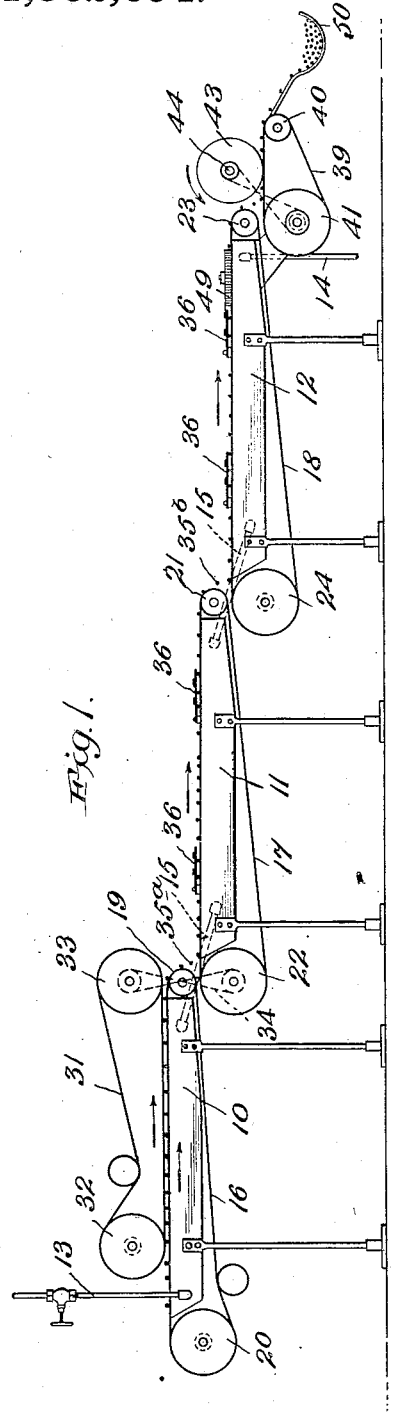
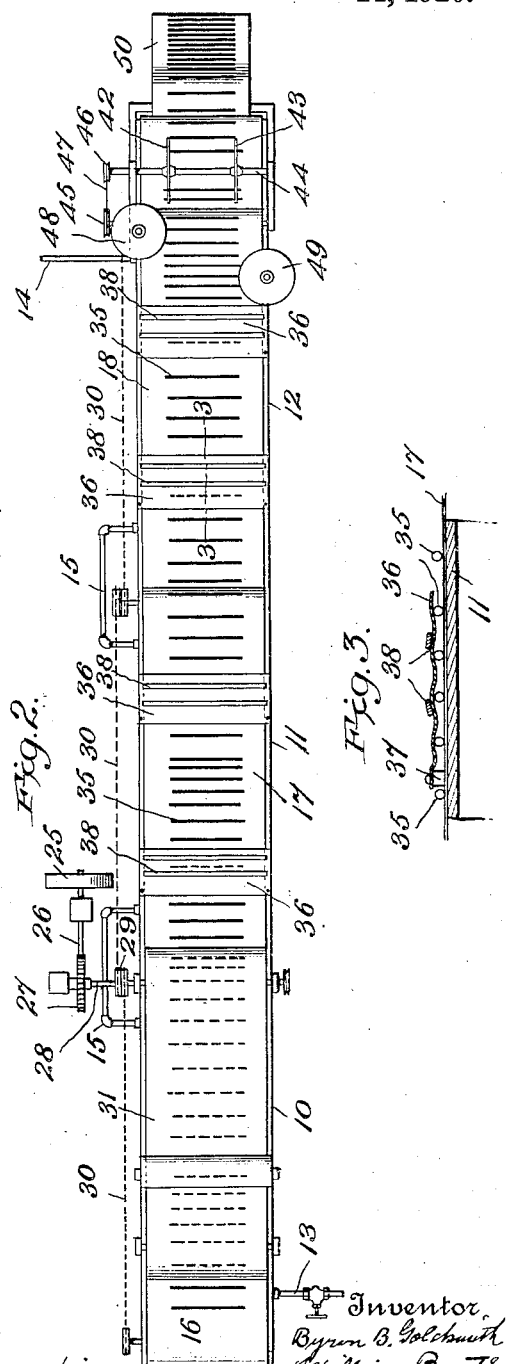

BYRON B. GOLDSMITH, OF NEW YORK, N. Y., AND WILLIAM BURT, SR., OF DELAWANNA, NEW JERSEY, ASSIGNORS TO AMERICAN LEAD PENCIL COMPANY, A CORPORATION OF NEW YORK.

PROCESS FOR MANUFACTURING RODS FROM PLASTIC MATERIAL.

1,362,094.      Specification of Letters Patent.      Patented Dec. 14, 1920.

Application filed May 2, 1918. Serial No. 232,145.

*To all whom it may concern:*

Be it known that we, BYRON B. GOLDSMITH and WILLIAM BURT, Sr., citizens of the United States, residing at New York, N. Y., and Delawanna, New Jersey, respectively, have invented certain new and useful Improvements in Processes for Manufacturing Rods From Plastic Material; and we do hereby declare the following to be a full, clear, and exact description of the invention, such as will enable others skilled in the art to which is appertains to make and use the same.

Our present invention relates to an improvement in the manufacture of rods and tubes from plastic material, and more particularly to the process of drying and hardening such rods and tubes. In various arts, as, for instance, in the manufacture of leads for lead pencils, it becomes necessary to convert a formless mass of plastic material, such as a mixture of clay and graphite made plastic by addition of water, into straight hard rods of a definite length.

Hitherto it has been customary to accomplish this by first squeezing the plastic material through an aperture in the wall of a suitable container, thereby producing a rod or strand of indefinite length, which is continuously discharged from the container. In order to be able to handle this continuous strand, the operator guides it into a circular pan, and allows it to build up a circular coil until the pan is full, when another operator unwinds it, and, breaking off pieces of suitable length, lays these lengths on a board provided with grooves, into which they fit. When the board is full the lead is covered by any suitable means to keep it down in drying, and the boards are set aside to permit the leads to dry. This drying is accomplished either at ordinary temperature or by means of artificial heat in dry rooms. It takes a number of days for this lead to dry at the ordinary temperature, and about two days when artificial heat is applied. This process involves a number of obvious disadvantages which it is the object of our present invention to avoid.

One disadvantage of the process above described is that, in order to prevent warping during the drying process, each individual rod or tube must be separately confined, for instance, by the use of carrier blocks with parallel grooves as above described. Much time and skilled service are involved in this operation, with a consequent increase in expense. Even then, it is impossible to get straight leads, because small elevations and depressions are formed which do not show at first, but increase and become visible after the lead has dried. Moreover, after the lead is dry it must be taken out of the grooves and cut to proper length. The material is so fragile, however, that the loss in this handling runs into a high percentage.

Another disadvantage is the length of time it takes to dry the lead by the present method. It is one object of our invention to accomplish in a few minutes what has hitherto taken days to carry out successfully, and we are able to do this with a greater efficiency, with very little breakage and to produce rods all of which are absolutely straight. All of the advantages of our improved process are equally important in the production of colored leads or crayons in which case, of course, special kinds of plastic materials are used.

Broadly expressed, our improved process consists in laying the rods or tubes cut to suitable lengths upon a flat heated surface and causing them to be rotated upon their own axes either continuously or intermittently. This rotation may be accomplished either by hand or by machinery. In certain cases we have found it well to confine the rods or tubes during the first stages of drying, and preferably to impart a slow and continuous rotation thereto. The rods or tubes are cut at first a little longer than is desired in the finished product, to allow for shrinkage in drying, and are finally cut to the length wanted in the finished product, after drying.

In the specific modification of our process which we have found most convenient, the rods or tubes are conveyed slowly over a heated surface or surfaces, the rotation desired being imparted by contact with the surfaces of suitable retarding devices. This is not essential, however, to our broad invention.

A variety of forms of apparatus may be used in the mechanical carrying out of our improved process, and we have illustrated a preferred form of machine which we have found useful and efficient in this connection, it being understood that we do not confine ourselves herein to the use of this or any particular form of machine; the apparatus herein described being claimed in a copending application for patent filed by Byron B. Goldsmith, William Burt, and Howard Barker, Serial No. 349813 (Renewal No.).

In the drawing, Figure 1 is a virtually diagrammatic side elevation of this preferred apparatus, Fig. 2 is a similar plan view of the same, and Fig. 3 is a sectional view of a detail, taken on the plane 3—3 in Fig. 2.

At 10, 11 and 12, are shown three steam tables, which may have any suitable construction. They are heated by steam, or other fluid heating medium, which enters by the pipe 13 and leaves by the pipe 14, passing from one steam table to another by the pipes 15. Other heating agencies may be used in this connection, such as electric wires, hot water, etc.

Belts 16, 17 and 18 are carried over the tables 10, 11 and 12, respectively. The belt 16 is driven by the drum 19, its opposite end passing over a drum 20. Similarly, the belt 17 has the driving drum 21 and the carrier drum 22; while the belt 18 is carried by the drums 23 and 24. We prefer to make these belts of canvas or other suitable material which absorbs water, since this aids in the drying operation. These belts may, of course, be driven in any convenient manner, and in Fig. 2 we have shown a main driving pulley 25 actuating a worm shaft 26 which drives a worm wheel 27 on the shaft 28. This shaft carries the drum 19, and also has a pulley 29 connected by belts or cords to similar pulleys on the shafts of certain of the other drums, as shown by the dotted lines 30.

Above the table 10 is a second or "confining" belt, 31, running on rollers 32 and 33, and driven in any suitable manner, as by the crossed belt 34. This confining belt is arranged with its lower course so close to the belt 16 as to bear gently upon the plastic rods as they are carried along. As indicated by the two arrows over the table 10, the contiguous courses of the belts 16 and 31 run in the same direction.

The belt 17 and table 11 are placed somewhat lower than the table 10, and similarly the belt 18 and table 12 are placed a little lower than the table 11. This arrangement is adopted so that the rods indicated by the thick lines 35, fall a short distance from one table to another as they are carried forward. This is shown at 35ª and 35ᵇ in Fig. 1. We have found that, by this expedient we are able to correct the small divergences from parallelism which are created between the rods as the belts move forward; which, if not so corrected from time to time, would become progressively greater until the rods would assume a slanting direction which would prevent their being turned.

In our preferred process we give the soft rods a preliminary drying by closely confining them against the heating agent, as between the belts 16 and 31. A slow turning of the rods during this stage of the drying may be accomplished, if desired, by running one or the other of the belts, preferably the belt 16, a little faster than the other. This difference is very slight, and, indeed it is not essential that there should be any difference in the speeds of the belts.

The preliminary drying under confinement having been completed on the table 10, and the rods having become a little more resistant, they are conveyed along the second table where they are subjected to intermittent rolling or rotary action. This we accomplish by providing at short intervals the friction bands 36 fixed at their forward corners close over the several belts 17 and 18 and lying loosely upon said belts. The studs 37 to which these bands are fixed are placed at the sides of the moving belts, and the leads or rods 35 pass between them and under the bands 36, in contact with their under surfaces. We prefer to provide slats 38 fastened across the upper surfaces of the bands 36, these slats preventing wrinkling and act by their weight to depress the band wherever they are attached. These depressions assits in turning the leads.

It is obvious that as many tables may be used as desired. The number of tables, their length, the speed of the belts, and the drying temperature employed, will be interdependent, and the determination of these details will be a matter of simple engineering, depending upon the materials used and the ends in view. Indeed it is within the scope of our invention to use only one table, and we may use only one kind of means for turning the rods.

When the drying is substantially completed, we prefer to discharge the rods upon the delivery belt 39, running on drums 40 and 41 suitably driven by means not shown. As the rods move along at this point, the two ends of each are cut off by the two knife-edged disks 42 and 43 on the shaft 44 driven in the direction of the arrow in Fig. 1, as by the pulleys 45 and 46 and the belt 47.

To insure symmetrical presentation of the rods 35 to the knives 42 and 43, we employ alining means, and for this purpose we have used successfully two horizontal disks, 48 and 49, turning on vertical shafts and having their peripheries preferably somewhat roughened. These rest with one side of the under surface of each upon the upper face of the belt 18, close to its point of discharge. They are thus caused to turn by friction with the belt, and, as the rods 35 are carried past them, their ends come into contact with these disks, which push them into proper position with respect to the cutting disks. When the rods have been cut, they are discharged in finished condition into the receiver 50.

While the most convenient means for promoting drying is a source of heat, preferably a flat table heated by steam or otherwise, our invention is not limited to the use of this expedient, but contemplates the imparting of an axial rotation to the rods during their subjection to any desiccating influence. By this rotation, however produced, we are able to preserve the straight form of the rods in spite of a very rapid drying, thereby saving a very great expense of time while insuring perfect results. It is also clear that the rotation may either be continuously in the same direction or may be a rocking movement, or back and forth rotation.

What we claim is—

1. As a part of the process of producing straight rods or tubes from plastic material, depositing the same while plastic upon a support and subjecting their diametrically opposed surfaces to pressure while imparting to them an axial rotation under a desiccating influence.

2. As a part of the process of producing straight rods or tubes from plastic material, depositing the same while plastic upon a conveyer, conveying them through a desiccating atmosphere, causing them to fall upon a second conveyer, and imparting to them an axial rotary movement as they move forward.

3. As a part of the process of producing straight rods or tubes from plastic material, conveying the unfinished rods over a heated surface and imparting an axial rotary movement to said rods as they move forward.

4. As a part of the process of producing straight rods or tubes from plastic material, conveying the unfinished rods over a heated surface, causing them to fall upon a second similar surface, and imparting an axial rotary movement to said rods as they move forward.

5. As a part of the process of producing straight rods or tubes from plastic material, subjecting the unfinished rods to a desiccating influence and intermittently imparting axial rotation thereto.

6. As a part of the process of producing straight rods or tubes of definite length from plastic material, forming soft plastic rods somewhat longer than desired, subjecting them to a desiccating influence while imparting to them an axial rotation, and finally cutting them to the proper length when sufficiently dried.

7. As a part of the process of producing straight rods or tubes from plastic material, conveying such rods in soft plastic condition under confinement over a heated surface, then conveying them free over a similar surface while subjecting them to intermittent axial rotation.

8. As a part of the process of producing straight rods or tubes from moist plastic material, rolling the unfinished rods while moist and plastic upon a heated absorbent surface.

9. The process of preserving the straightness of plastic rods while drying which consists in depositing them in plastic form upon a moving carrier and applying frictional means to their upper surfaces to cause them to rotate as they move forward through a desiccating atmosphere.

10. The process of preserving the straightness of plastic rods while drying them which consists in bringing the same between two opposed surfaces which engage the rods frictionally and causing one or both of said surfaces to move at such relative speed as to cause the rods to rotate while drying.

11. As a part of the process of producing straight rods from plastic material, rolling the unfinished rods while moist and plastic upon a heated surface.

In testimony whereof we affix our signatures.

BYRON B. GOLDSMITH.
WM. BURT, Sr.